Feb. 1, 1944.    G. E. DANIELS    2,340,583
DIRT SCRAPER
Filed Aug. 25, 1942    2 Sheets-Sheet 2

INVENTOR.
GORDON E. DANIELS
BY
ATTORNEY.

Patented Feb. 1, 1944

2,340,583

UNITED STATES PATENT OFFICE 2,340,583

DIRT SCRAPER

Gordon E. Daniels, Nashville, Tenn.

Application August 25, 1942, Serial No. 455,999

3 Claims. (Cl. 280—109)

The present invention relates to dirt scraping apparatus, and has particular reference to apparatus wherein a dirt accumulating body, having a scraping edge or blade associated therewith, is dragged over the surface of the ground to be scraped, the scraping edge biting or cutting into the surface of the ground, and the forward movement of the body effecting movement of the dirt or other materials scraped upwardly into the body. When the scraper body has received a capacity load, or less, as desired, it is raised to remove the scraper edge from contact with the ground and it is then hauled to a point where it is desired to discharge the load. Such a dirt scraping apparatus is disclosed in my co-pending application Serial No. 338,908, filed June 5, 1940, and since matured and the Patent No. 2,301,158 issued on November 3, 1942. Reference is hereby made to said patent for a disclosure of a complete scraping apparatus including mechanism not specifically disclosed herein.

One object of the present invention is to reduce the stresses imposed upon the structural members of a hoist mechanism for a scraping apparatus.

A further object is to permit a limited amount of transverse rocking movement of a truck assembly for supporting one end of a scraping apparatus.

The manner in which the above and other objects of the invention are accomplished will be readily understood on reference to the following specification when read in conjunction with the accompanying drawings wherein:

Fig. 3 is a front view, partly in section and partly broken away, of the truck and post assembly.

Figure 1:
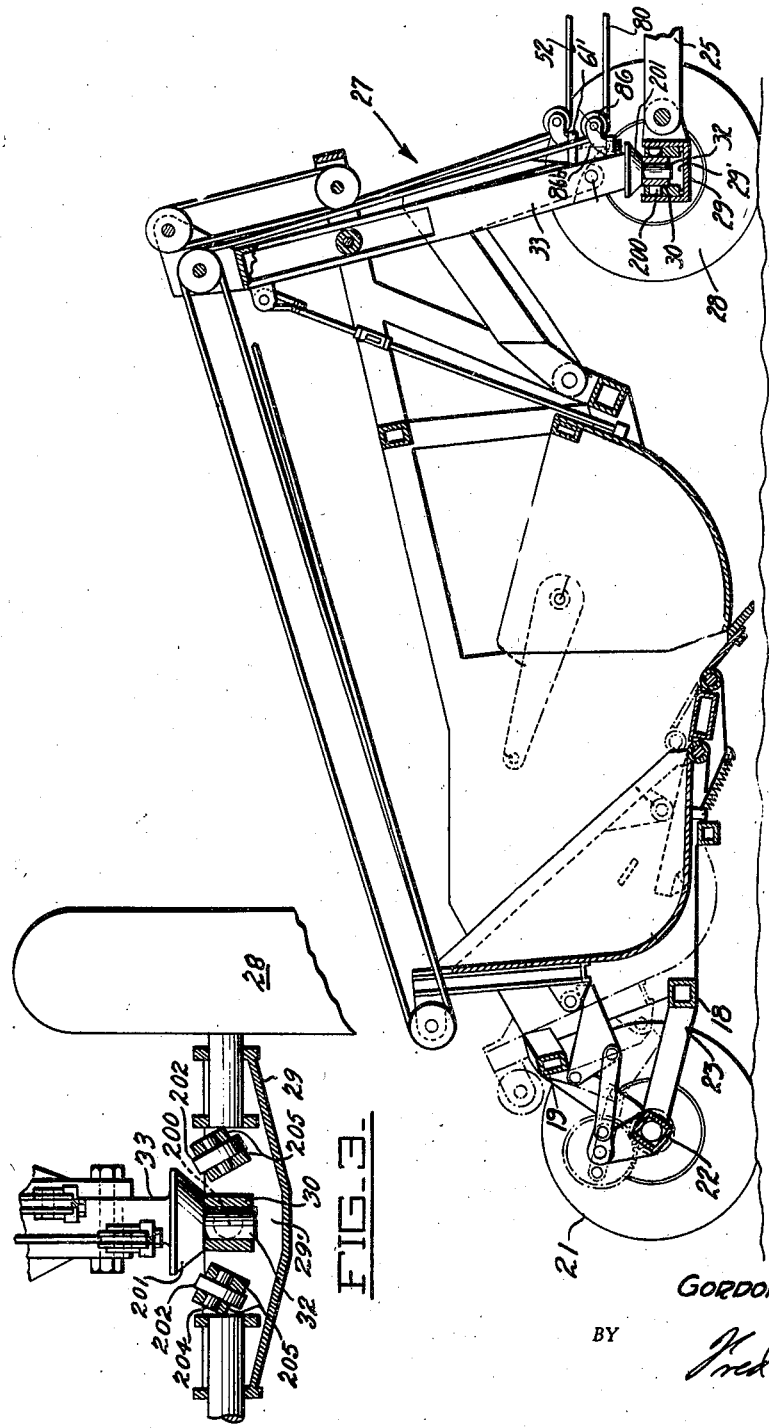
Fig. 1 is a longitudinal sectional view in elevation of the scraping apparatus embodying the present invention.
Figure 2:
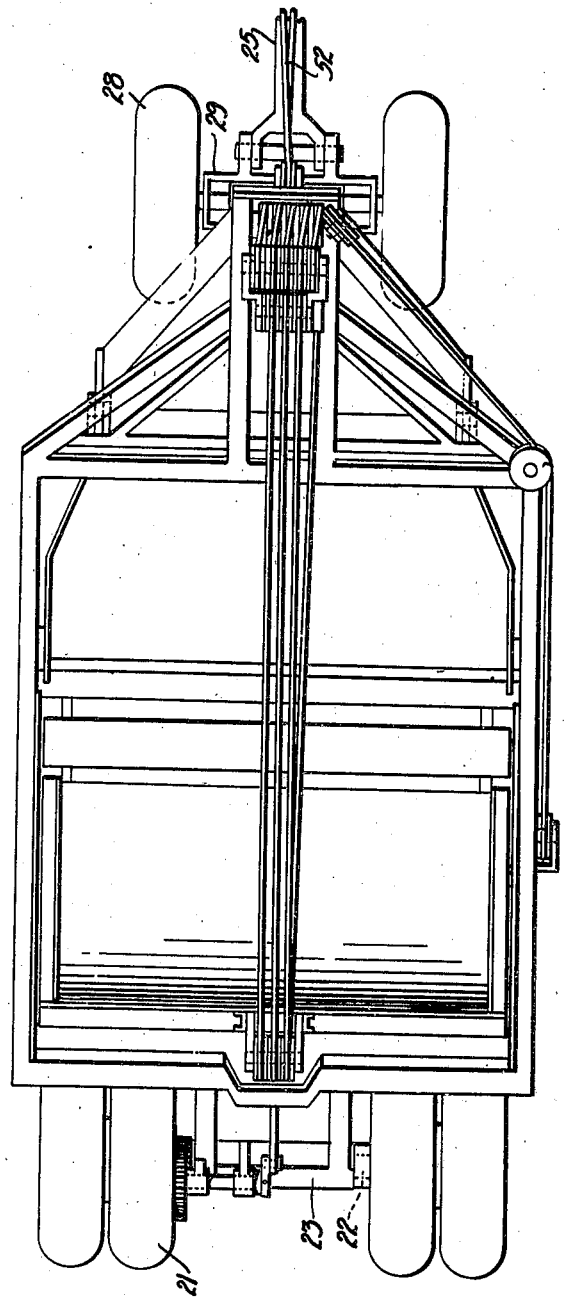
Fig. 2 is a plan view of the scraping apparatus.

Referring to the drawings, the rear of the scraper is supported by wheels 21, having a common axle 22, which is supported by brackets 23 extending from scraper frame beams 18 and 19.

While the forward end of the scraper is supported for a limited vertical movement on a truck, generally indicated at 27, mounted on wheels 28. The axle 29 for these forward wheels 28 has pivotally secured thereto a tongue 25 which is drawn by a suitable tractor, (not shown).

A bearing block 30 (Figs. 1 and 3) is located in a well 29' formed in the axle and has a pair of trunnions 200 journaled in bearings provided in the axle. The block 30 has a vertically extending bearing aperture in which is journaled a bearing stud 32 forming the lower end of a guide post 33 along which the forward end of the scraper is guided in the manner disclosed in my aforesaid patent.

According to the present invention, means are provided to permit a certain amount of transverse rocking of the front wheel axle 29 so that the front wheels and the rear wheels may follow an uneven ground surface, while limiting the amount of rocking movement and at the same time permitting steering of the front wheels and turning the axle 29 about the vertical axis of the bearing stud 32. As shown in Figs. 1 and 3, a frusto-conical member 201 is fixed to the bottom of the post 33 adjacent the stud 32. This member is adapted to be engaged by either of a pair of rollers 202 journaled on pins 204 supported by brackets 205 which are suitably secured to the sides of the axle 29. Thus, when, upon movement of the scraper over uneven ground surface, the axle 29 or the scraper body is rocked about the axes of the trunnions 200 a certain amount, a roller 202 will engage the conical member 201 and will prevent further relative rocking of the axle 29 and the post 33. The rollers 202 will, however, permit steering of the axle 29 even when it is in its extreme transverse rocked position. The pins 204 for the rollers 202 are located with their axes extending substantially parallel with the engaging portions of the conical member 201 so that the peripheries of the rollers may directly engage the surface of the member. It will be noted that the arrangement of the conical member 201 and rollers 202 in the manner shown results in a limiting means of rigid construction, and yet of a minimum amount of material and a compact structure.

It is to be understood that, while I have herein described and illustrated a preferred form of my invention, it is not limited to the precise construction as disclosed herein, but includes within its scope whatever changes fairly come within the spirit of the appended claims.

What I claim as new and desire to secure by Letters Patent is:

1. In a scraping apparatus, the combination with a body including a supporting structure; of means for supporting said structure including a dirigible truck including a cross member; means supporting said structure on said cross member for movement about a plurality of intersecting axes, a substantially conical bearing member carried by said structure and extending coaxial with one of said axes, and rollers rotatably supported by said cross member for engaging said conical member upon movement of said structure about another of said axes.

2. In a scraping apparatus, the combination with a body including a supporting structure; of means for supporting said structure comprising a dirigible truck including a cross member; a bearing member supporting said structure on said cross member for movement about substantially horizontal and vertical axes, said axes intersecting each other, a substantially conical bearing member carried by said structure and extending coaxial with said vertical axis, and rollers rotatably supported by said cross member for engaging said conical member upon movement of said structure about said horizontal axis, said rollers being rotatable about axes substantially parallel with the engaging portions of said conical member.

3. In a scraping apparatus, the combination in accordance with claim 2 wherein said rollers are arranged to permit a limited movement of said structure about said horizontal axis.

GORDON E. DANIELS.